United States Patent
Rothley et al.

(10) Patent No.: US 6,710,348 B1
(45) Date of Patent: Mar. 23, 2004

(54) APPARATUS FOR SENSING ELECTROMAGNETIC RADIATION

(75) Inventors: Manfred Rothley, Kraichtal (DE); Roland Mueller-Fiedler, Leonberg (DE); Erich Zabler, Stutensee (DE); Lars Erdmann, Hörselgau (DE); Wilhelm Leneke, Wiesbaden (DE); Marion Simon, Marburg (DE); Karlheinz Storck, Lorch (DE); Joerg' Schieferdecker, Wiesbaden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/720,938

(22) PCT Filed: Jun. 26, 1999

(86) PCT No.: PCT/DE99/01869

§ 371 (c)(1),
(2), (4) Date: May 2, 2001

(87) PCT Pub. No.: WO00/02254

PCT Pub. Date: Jan. 13, 2000

(30) Foreign Application Priority Data

Jun. 30, 1998 (DE) .......................................... 198 29 027
May 25, 1999 (DE) .......................................... 199 23 606

(51) Int. Cl.[7] .................................................. G01J 5/02
(52) U.S. Cl. ..................................................... 250/353
(58) Field of Search ......................................... 250/353

(56) References Cited

U.S. PATENT DOCUMENTS

| 4,675,525 A | * | 6/1987 | Amingual et al. ....... 250/338.1 |
| 4,695,719 A | | 9/1987 | Wilwerding |
| 5,401,968 A | * | 3/1995 | Cox ............................ 250/353 |
| 5,701,008 A | * | 12/1997 | Ray et al. ................... 250/352 |
| 5,907,151 A | * | 5/1999 | Gramann et al. ......... 250/214.1 |

FOREIGN PATENT DOCUMENTS

| DE | 42 21 037 A1 | 1/1994 |
| DE | 43 01 456 C1 | 6/1994 |
| DE | 296 05 813 U1 | 6/1996 |
| DE | 196 16 969 A1 | 10/1997 |
| EP | 0 809 304 A2 | 11/1997 |
| EP | 0 810 440 A2 | 12/1997 |

OTHER PUBLICATIONS

Motamedi et al., "Micro–Opto–Electro–Mechanical Devices and On–Chip Optical Processing", Optical Engineering, US, Soc. of Photo–Optical Instrumentation Engineers, Bellingham, May 21, 1997, vol. 36, No. 5, pp. 1282–1297.

* cited by examiner

Primary Examiner—Constantine Hannaher
(74) Attorney, Agent, or Firm—Kenyon & Kenyon

(57) ABSTRACT

An apparatus for sensing electromagnetic radiation with local resolution for image-producing sensors that can be economically produced and installed is decribed. This is achieved, in that a micromechanically producible optical imaging system is provided.

11 Claims, 4 Drawing Sheets

APPARATUS FOR SENSING ELECTROMAGNETIC RADIATION

FIELD OF INVENTION

The present invention relates to an apparatus for sensing electromagnetic radiation with local resolution.

BACKGROUND INFORMATION

Conventional semiconductor detectors, for example for infrared radiation, include a detector structure constructed on a semiconductor substrate. In this context, detector arrays comprising so-called thermopile sensors are suitable for detecting infrared radiation. The substrate of the detector structure is usually joined to a housing into which a protective window is set above the detector structure. The protective window is transparent to the radiation that is to be detected, and protects the detector structure from disruptive environmental influences, for example from soiling.

In combination with a spatially resolving detector array, it is possible with such an apparatus to implement an image-producing sensor. Image-producing IR sensors are required, for example, for motor vehicle interior monitoring. An image-producing process requires the provision of an optical imaging system, e.g. an imaging lens, which images onto the plane of the detector array the object that is to be imaged. Conventional imaging lenses with conventional materials represent a considerable cost factor for sensor systems of this kind. Lower-cost plastic lenses are limited in terms of their applicability, since they are, for example, temperature-sensitive.

SUMMARY

An object of the present invention is to provide an apparatus for sensing electromagnetic radiation with local resolution for image-producing purposes that can be economically manufactured and installed.

An apparatus according to the present invention is accordingly characterized in that a micromechanically producible optical imaging system is provided. An imaging system of this kind, in particular in the form of a lens, can be manufactured micromechanically from semiconductor material, for example from silicon, in large quantities and economically. The imaging properties and temperature stability of such systems are sufficient, especially in the infrared region, that image-producing sensors can be equipped with them.

In an advantageous embodiment of the present invention, the micromechanically producible imaging system is joined rigidly to the semiconductor substrate of the detector structure. This join can be made, for example, by installation on a protective housing for the detector structure. Because of the rigid join to the detector structure, the apparatus according to the present invention is ready to use without additionally necessary alignment of the imaging system, thus decreasing the installation outlay for the detector apparatus at the place of use.

A micromechanically producible optical imaging system according to the present invention can, for example, include multiple lenses, thus making such an imaging system suitable in particular for the use of a detector structure having multiple separate detector elements. It is particularly advantageous in this context to associate one lens with each detector element. The optical axes of the individual lenses may be, for example, oriented differently, thus yielding a large coverage angle for monitoring of an area.

The combination of one group of detector elements each with one or more lenses is also advantageous depending on the application, for example, to achieve a large coverage angle for a detector structure made up of multiple detector elements, or to achieve local resolution for a group of detector elements.

Om a further advantageous embodiment of the present invention, the optical imaging system is used simultaneously as a protective window for the detector structure. A separate protective window thereby becomes superfluous, and the apparatus according to the present invention becomes more economical.

In an embodiment with a protective housing, the optical imaging system (e.g. one or more micromechanical lenses) may be attached in place of the former protective window in the corresponding mount of the protective housing.

Other configurations are, however, also, possible for example, the micromechanical imaging system can be joined using spacers to the substrate of the detector structure. Such a join can be brought about, for example, by adhesive bonding or by anodic bonding, etc. All known and future types of joins in the semiconductor field, in particular in the context of silicon, can be used for this purpose.

A so-called lens array made up of multiple lenses, as set forth above, can be joined rigidly to the detector array with small spacing tolerances, for example using micromechanical spacers as intermediate supports. A rigid join makes the apparatus ready for use without further alignment.

Individual detector elements of a detector structure can be separated from one another by optical partitions. These partitions, which can be constituted, for example, by the surface of an intermediate support configured, for example, in honeycomb fashion, can prevent any undesirable cross-coupling of radiation onto an adjacent detector element. An intermediate support of this kind is preferably made of an infrared-opaque material such as, for example, Pyrex glass.

To decrease transmission through such a partition, a corresponding coating of the partition can also be provided.

As discussed above, the micromechanical imaging system may be constructed on a semiconductor substrate. In addition to economical manufacture, this yields the additional advantage that the substrate of the imaging system can be effectively joined to the substrate of the detector structure, for example using one of the capabilities referred to above.

It is particularly advantageous in this context if the substrate of the optical imaging system and the substrate of the detector system have the same material, so that a join between the substrates is readily possible. If applicable, a spacer can also have the same material. The use of silicon is particularly suitable in this context.

In a further advantageous embodiment of the present invention, the detector structure is applied on the back side of the substrate of the optical imaging system. This allows a particularly compact detector apparatus to be realized. In this context, as in the exemplary embodiment with spacers described above the detector structure can be placed as a separate structure onto the substrate of the imaging system and joined to it. In this embodiment as in the example described above with spacers, alignment of the imaging system with respect to the detector can be performed at the wafer level before the individual sensors are sectioned. This means that two wafers having a plurality of micromechanical imaging systems and a plurality of detector structures are aligned with respect to one another and attached to one another before the individual sensors are separated by cutting the wafers. Alignment can thus be performed in particularly simple and highly accurate fashion.

In a further advantageous embodiment of the present invention, the detector structure is constructed on the back side of the substrate of the imaging system as a monolithic construction. In this case, the complete arrangement comprising the imaging system and detector structure is constructed on one wafer. This embodiment provides great advantages in terms of manufacturing outlay and alignment.

With a monolithic construction as described above, a detector structure that is irradiated from the back side is advisable. This means that the substrate on which the detector structure is constructed should be transparent to the radiation being detected.

In order to construct conventional thermopile sensors with this procedure, a membrane may be constructed of, for example, silicon nitride, in order to prevent excessive thermal diffusion of the heat created upon incidence of the radiation that is to be detected. That heat is detected by corresponding thermopile elements. A membrane of this kind can be produced in monolithic fashion, for example, by anisotropic etching of a cavity and/or by etching out a porous layer. All suitable micromechanical production methods, in particular including future manufacturing methods, can be used for this purpose.

DETAILED DESCRIPTION

Figure 1:
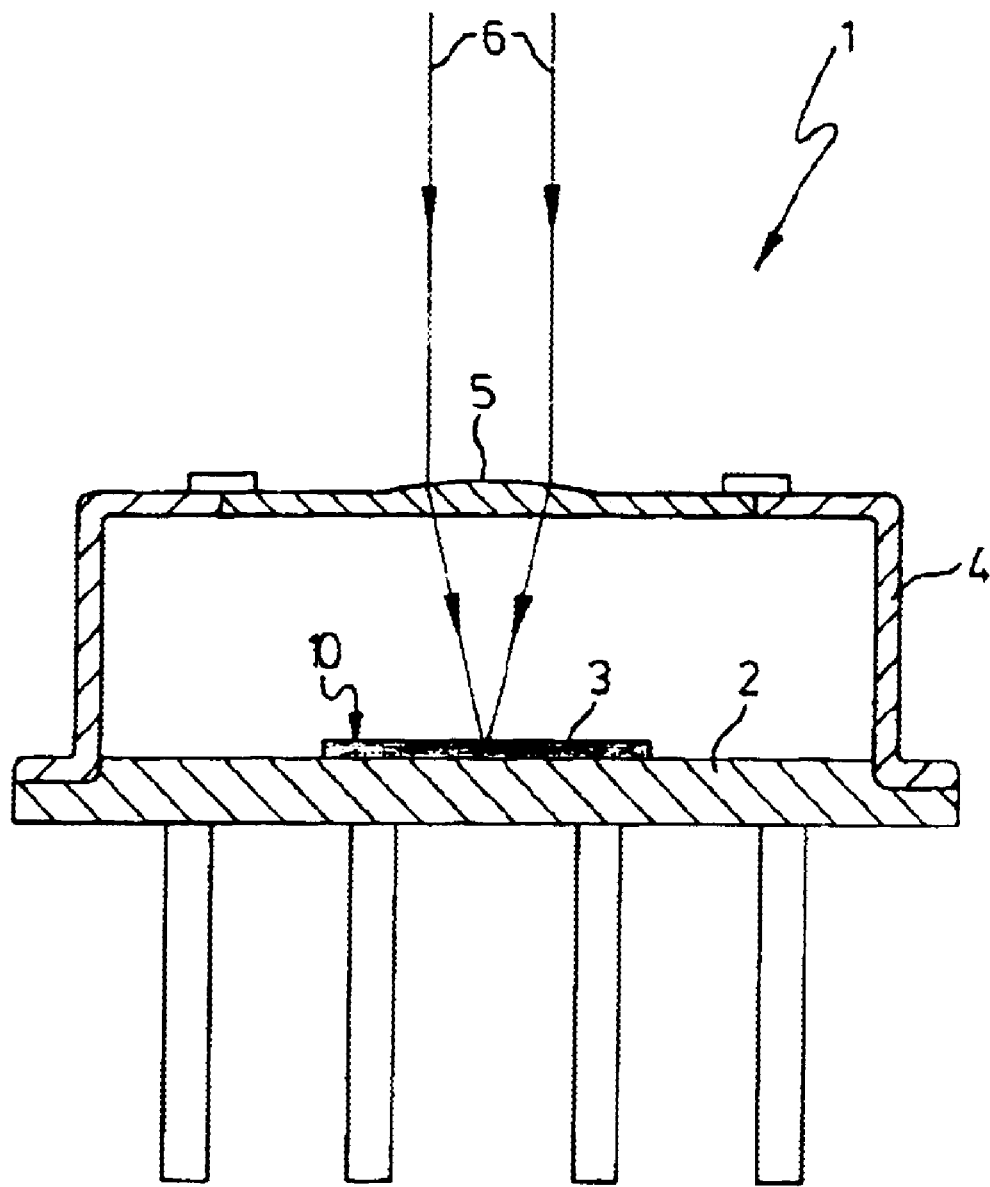
FIG. 1 shows a schematic sectioned depiction of a first example embodiment of the present invention.

Apparatus 1 as shown in FIG. 1 includes a mounting plate 2 on which a substrate 10 having a detector structure 3 is constructed. Detector structure 3 is depicted in simplified fashion and can contain, for example, a plurality of thermopile sensors.

A protective housing 4 covers detector structure 3 and protects it from disruptive environmental influences, for example from soiling. Above detector structure 3, a micromechanical lens 5 is fitted in protective housing 4 as a protective window. Through this, an image-producing method can be carried out using apparatus 1. The image-producing properties resulting from lens 5 are indicated schematically by two beams 6.

A separate lens can be dispensed with in this embodiment, thus allowing the elimination not only of material outlay but also of complex alignment. In addition, a micromechanical lens 5 in accordance with the exemplary embodiment can be economically manufactured in large quantities.

Figure 2:
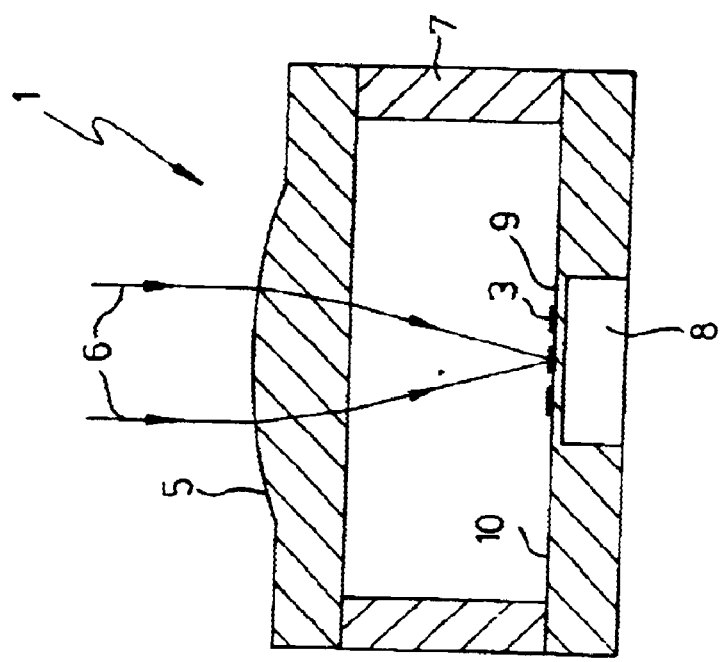
FIG. 2 shows a depiction, corresponding to FIG. 1, of a second example embodiment of the present invention

FIG. 2 shows once an apparatus 1 according to a second embodiment of the present invention. In FIG. 2, micromechanical lens 5 is joined, without a protective housing, via spacers 7 to substrate 10 of detector structure 3. A cavity 8 is shown beneath detector structure 3, so that substrate 2 forms a thin membrane 9 in the region of detector structure 3. The thin membrane 9 prevents excessively rapid dissipation of the heat resulting from the incident radiation. This heat is detected by the thermopile elements. Because thermal diffusion is limited by the thin configuration of membrane 9, the sensitivity of apparatus 1 is thus improved.

The configuration as shown in FIG. 2 can be produced in such a way that by production engineering alone, the alignment between lens 5 and substrate 2 is performed simultaneously for a plurality of components each present on a wafer. After the join between lens 5 and substrate 2 has been made via spacers 7, sectioning can then occur, each sensor apparatus 1 being equally well-aligned.

Figure 3:
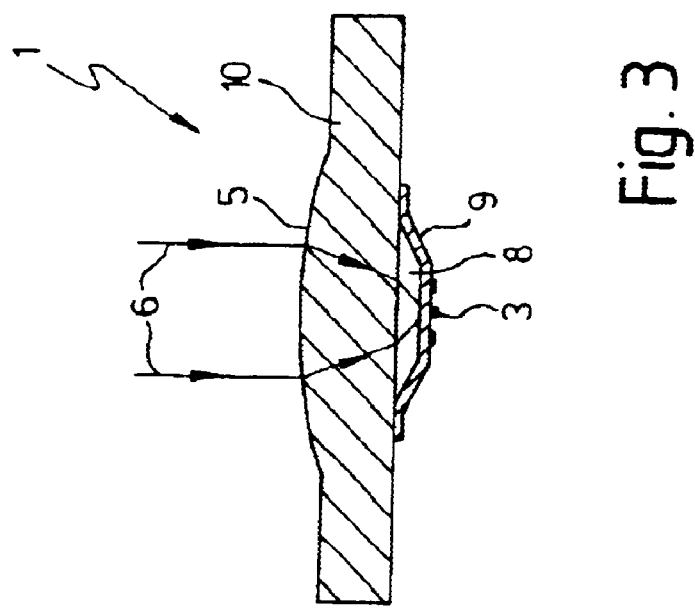
FIG. 3 shows a corresponding depiction of a third example embodiment of the present invention

In the apparatus as shown in FIG. 3, membrane 9 of detector structure 3 is already directly joined to substrate 10 of micromechanical lens 5. Micromechanical lens 5 is configured as a convexity on substrate 10, while membrane 9 is applied on the back side of substrate 10. Membrane 9 with detector structure 3 can, for example, be constructed separately and then joined to substrate 10 of lens 5, for example by bonding or adhesion. Here, as in the above-described exemplary embodiment according to FIG. 2, alignment and joining are possible simultaneously for a plurality of components by fitting together two wafers before the individual sensors 1 are sectioned. The embodiment shown in FIG. 3 represents the smallest construction, among the exemplary embodiments described, for an apparatus according to the present invention.

In a development of this embodiment, the entire apparatus 1 is constructed monolithically on a substrate by micromechanical production methods. In the embodiment shown in FIG. 3, cavity 8 is located between the back side of lens 5 and membrane 9. With monolithic construction, this cavity is configured after production of the membrane. This can be done by etching, for example anisotropic etching or etching of a porous layer provided for the purpose (a so-called sacrificial layer). Once again, any appropriate presently known or future micromechanical manufacturing techniques may be used for the monolithic procedure.

Figure 4:
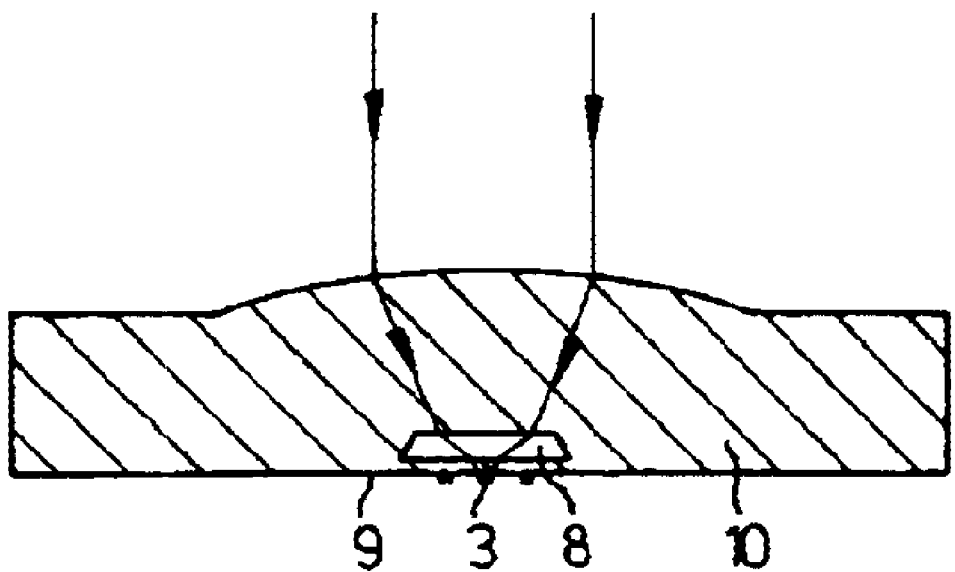
FIG. 4 shows another example embodiment of the present invention using monolithic construction.

FIG. 4 shows an embodiment using the monolithic procedure comparable to the above example, cavity 8 being created in the interior of substrate 10 so that membrane 9 and detector structure 3 are located on the flat back side of substrate 10.

In FIG. 3 and FIG. 4, detector structure 3 is indicated on the back side of membrane 9, as it would be provided in the case of a monolithic procedure. In such a case, membrane 9 is transparent to radiation 6 that is to be detected.

In the case of an infrared sensor, silicon, for example may be used as the substrate material. Silicon may also be used for the exemplary embodiments decribed above, both for the construction of detector structure 3 as substrate 10 and for the construction of micromechanical lens 5. Silicon is a comparatively inexpensive semiconductor, and thus makes possible economical manufacture of the apparatus according to the present invention.

Figure 5:
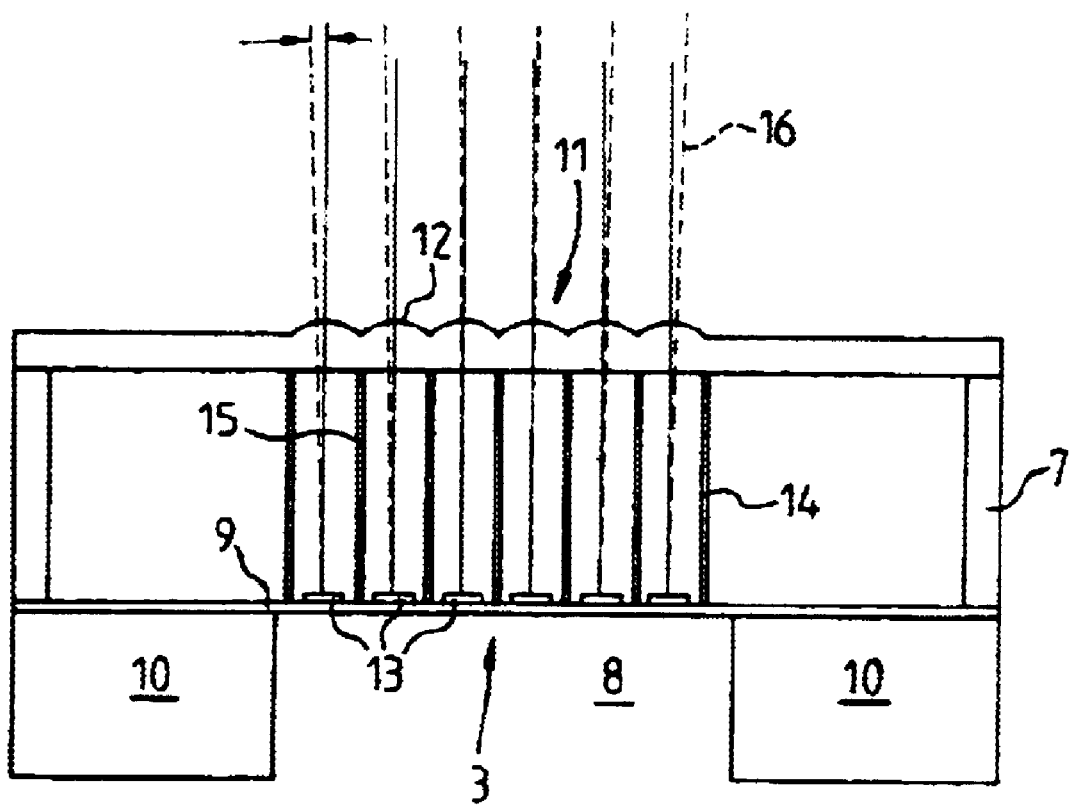
FIG. 5 shows a example embodiment of the present invention with a so-called lens array.

FIG. 5 shows an embodiment of an apparatus according to the present invention having a lens array 11 that has multiple lenses 12 lying next to one another.

Detector structure 3 includes a variety of detector elements 13 that lie on a membrane 9. In order to decrease dissipation of the heat to be detected by detector elements 13, a cavity 8 has been produced in substrate 10.

Micromechanical lens array 11 is rigidly joined, via spacers 7 and intermediate supports 14 surrounding detector elements 13, to detector structure 3; partitions 15 of intermediate supports 14 are configured to be opaque to infrared radiation in order to prevent cross-coupling of heat radiation onto an adjacent detector element 13. The schematically indicated optical axes 16 of the individual lenses 12 of lens array 11 are inclined with respect to one another so that different solid angle regions can be imaged onto the detector elements.

Intermediate supports 14 may be configured in honeycomb form, so that they can be constructed next to one another in planar fashion without interstices.

What is claimed is:

1. An apparatus for sensing electromagnetic radiation, comprising:
   a detector structure to sense electromagnetic radiation, the detector structure formed on a semiconductor substrate;
   a protective window for the detector structure; and
   a micromechanical optical imaging system including a lens configured to form an image of a subject to be imaged onto a plane of the detector structure, the lens having a convexity on a side facing away from the detector structure, the lens being arranged relative to the detector structure so that a cavity is between the lens and the detector structure;
   wherein the optical imaging system is rigidly joined to the detector structure.

2. An apparatus for sensing electromagnetic radiation, comprising:
   a detector structure to sense electromagnetic radiation, the detector structure formed on a semiconductor substrate;
   a protective window for the detector structure; and
   a micromechanical optical imaging system including a lens configured to form an image of a subject to be imaged onto a plane of the detector structure, the lens having a convexity on a side facing away from the detector structure, the lens being arranged relative to the detector structure so that a cavity is between the lens and the detector structure;
   wherein the detector structure includes multiple separate detector elements and the imaging system includes multiple lenses, wherein at least one of the multiple lenses is provided for a group of the detector elements.

3. An apparatus for sensing electromagnetic radiation, comprising:
   a detector structure to sense electromagnetic radiation, the detector structure formed on a semiconductor substrate;
   a micromechanical optical imaging system including a lens configured to form an image of a subject to be imaged onto a plane of the detector structure, the lens having a convexity facing away from the detector structure, wherein the optical imaging system forms a protective window for the detector structure, and wherein the lens is arranged relative to the detector structure so that a cavity is between the lens and the detector structure.

4. An apparatus for sensing electromagnetic radiation, comprising:
   a detector structure to sense electromagnetic radiation, the detector structure formed on a semiconductor substrate;
   a protective window for the detector structure;
   a micromechanical optical imaging system including a lens configured to form an image of a subject to be imaged onto a plane of the detector structure, the lens having a convexity on a side facing away from the detector structure, the lens being arranged relative to the detector structure so that a cavity is between the lens and the detector structure; and
   a protective housing, the optical imaging system being set into the protective housing.

5. An apparatus for sensing electromagnetic radiation, comprising:
   a detector structure to sense electromagnetic radiation, the detector structure formed on a semiconductor substrate;
   a protective window for the detector structure;
   a micromechanical optical imaging system including a lens configured to form an image of a subject to be imaged onto a plane of the detector structure, the lens having a convexity on a side facing away from the detector structure, the lens being arranged relative to the detector structure so that a cavity is between the lens and the detector structure; and
   spacers provided between the substrate of the detector structure and the optical imaging system.

6. An apparatus for sensing electromagnetic radiation, comprising:
   a detector structure to sense electromagnetic radiation, the detector structure formed on a semiconductor substrate;
   a protective window for the detector structure; and
   a micromechanical optical imaging system including a lens configured to form an image of a subject to be imaged onto a plane of the detector structure, the lens having a convexity on a side facing away from the detector structure, the lens being arranged relative to the detector structure so that a cavity is between the lens and the detector structure;
   wherein the detector structure includes multiple separate detector elements, the detector elements being separated from one another by optical partitions.

7. The apparatus according to claim 6, wherein the optical partitions are coated to decrease transmission.

8. An apparatus for sensing electromagnetic radiation, comprising:
   a detector structure to sense electromagnetic radiation, the detector structure formed on a semiconductor substrate;
   a protective window for the detector structure; and
   a micromechanical optical imaging system including a lens configured to form an image of a subject to be imaged onto a plane of the detector structure, the lens having a convexity on a side facing away from the detector structure, the lens being arranged relative to the detector structure so that a cavity is between the lens and the detector structure;
   wherein the optical imaging system is constructed on a semiconductor substrate, and
   wherein the detector structure is applied on a back side of the substrate of the optical imaging system.

9. apparatus for sensing electromagnetic radiation, comprising:
   a detector structure to sense electromagnetic radiation, the detector structure formed on a semiconductor substrate;
   a protective window for the detector structure; and
   a micromechanical optical imaging system including a lens configured to form an image of a subject to be imaged onto a plane of the detector structure, the lens having a convexity on a side facing away from the detector structure, the lens being arranged relative to the detector structure so that a cavity is between the lens and the detector structure;
   wherein the detector structure includes thermocouples.

10. An apparatus for sensing electromagnetic radiation, comprising:
    a detector structure to sense electromagnetic radiation, the detector structure formed on a semiconductor substrate;

a protective window for the detector structure; and a micromechanical optical imaging system including a lens configured to form an image of a subject to be imaged onto a plane of the detector structure, the lens having a convexity on a side facing away from the detector structure, the lens being arranged relative to the detector structure so that a cavity is between the lens and the detector structure;

wherein the optical imaging system and the detector structure are formed by joining two wafers prior to sectioning.

11. A method for producing an apparatus for sensing electromagnetic radiation, comprising:

monolithically producing a micromechanical optical imaging system and a detector structure, a cavity being formed between the detector structure and the optical imaging system, the detector structure for sensing the electromagnetic radiation, the optical imaging system for forming an image of a subject to be imaged onto a plane of the detector structure.

* * * * *

UNITED STATES PATENT AND TRADEMARK OFFICE
CERTIFICATE OF CORRECTION

PATENT NO. : 6,710,348 B1
DATED : March 23, 2004
INVENTOR(S) : Manfred Rothley et al.

It is certified that error appears in the above-identified patent and that said Letters Patent is hereby corrected as shown below:

<u>Title page,</u>
Item [57], ABSTRACT,
Line 4, "achieved, in that" should be changed to -- achieved in that --;

<u>Column 2,</u>
Line 7, "Om a further advantageous embodiment" should be changed to -- In an embodiment --;
Line 58, "described above the detector" should be changed to -- described above, the detector --;

<u>Column 3,</u>
Lines 30, 32 and 34, "present invention;" should be changed to -- present invention. --;
Line 61, "shows once an apparatus" should be changed to -- shows an apparatus --;

<u>Column 6,</u>
Line 50, "9. apparatus" should be changed to -- 91. An apparatus --.

Signed and Sealed this

Seventh Day of December, 2004

JON W. DUDAS
*Director of the United States Patent and Trademark Office*